(12) United States Patent
Ishikawa et al.

(10) Patent No.: US 9,292,033 B2
(45) Date of Patent: Mar. 22, 2016

(54) FORCE-FEEDBACK PLANE SLIDE INPUT DEVICE

(71) Applicant: ALPS ELECTRIC CO., LTD., Tokyo (JP)

(72) Inventors: Shinji Ishikawa, Tokyo (JP); Hironori Takeda, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 305 days.

(21) Appl. No.: 14/154,625

(22) Filed: Jan. 14, 2014

(65) Prior Publication Data

US 2014/0230716 A1 Aug. 21, 2014

(30) Foreign Application Priority Data

Feb. 15, 2013 (JP) ................................. 2013-027447

(51) Int. Cl.

| | |
|---|---|
| G01D 13/00 | (2006.01) |
| G05G 5/03 | (2008.04) |
| G05G 9/047 | (2006.01) |
| H01H 15/00 | (2006.01) |
| H01H 15/02 | (2006.01) |
| H01H 15/10 | (2006.01) |
| H01H 15/16 | (2006.01) |

(Continued)

(52) U.S. Cl.
CPC ................. *G05G 5/03* (2013.01); *G05G 9/047* (2013.01); *G01D 13/00* (2013.01); *G05G 2009/04766* (2013.01); *H01H 9/16* (2013.01); *H01H 15/00* (2013.01); *H01H 15/02* (2013.01); *H01H 15/102* (2013.01); *H01H 15/16* (2013.01); *H01H 15/24* (2013.01); *H01H 25/00* (2013.01)

(58) Field of Classification Search
CPC ................... G01D 13/00; G01D 2009/04766; G05G 5/03; G05G 9/047; H01H 15/00; H01H 15/02; H01H 15/10; H01H 15/102; H01H 15/16; H01H 15/24; H01H 25/00; H01H 9/16
USPC ......... 116/205, 201; 74/469–566; 200/4, 5 R, 200/17 R, 547–551; 340/407.1
See application file for complete search history.

(56) References Cited

U.S. PATENT DOCUMENTS

| 5,012,230 A | * | 4/1991 | Yasuda | ................... A63F 13/06 345/160 |
| 5,920,042 A | * | 7/1999 | Gotoh | .................. B60H 7/0573 200/16 C |

(Continued)

FOREIGN PATENT DOCUMENTS

JP 2012-79620 4/2012

*Primary Examiner* — R. A. Smith
*Assistant Examiner* — Tania Courson
(74) *Attorney, Agent, or Firm* — Brinks Gilson & Lione

(57) ABSTRACT

A force-feedback plane slide input device includes: a base body having a housing space formed in a rectangular shape; a slider configured to move within the housing space along a plane including a first direction and a second direction which are orthogonal to each other; an operation member integrally provided with the slider; a first actuating member configured to be actuated by movement of the operation member in the first direction; a second actuating member configured to be actuated by movement of the operation member in the second direction; and a force-feedback unit configured to feed back a sense of force to an operator. The slider includes a first slider member and second slider member. A length of an edge in the first direction of the housing space is substantially the same as a width in the first direction of the second slider member.

3 Claims, 12 Drawing Sheets

(51) Int. Cl.
*H01H 15/24* (2006.01)
*H01H 25/00* (2006.01)
*H01H 9/16* (2006.01)

(56) References Cited

U.S. PATENT DOCUMENTS

| | | | | |
|---|---|---|---|---|
| 6,796,201 B2 * | 9/2004 | Onodera | ............... | G05G 9/04 |
| | | | | 273/148 B |
| 6,965,084 B2 * | 11/2005 | Kumasaka | ........... | H01H 25/002 |
| | | | | 200/5 R |
| 7,439,460 B1 * | 10/2008 | Watson | ............... | B60R 16/005 |
| | | | | 200/18 |
| 8,586,885 B2 * | 11/2013 | Ishikawa | ............... | G05G 1/02 |
| | | | | 200/252 |
| 8,878,657 B2 * | 11/2014 | Periquet | ............... | F16F 9/535 |
| | | | | 188/267 |
| 2003/0011569 A1 * | 1/2003 | Onodera | ............... | G05G 9/04 |
| | | | | 345/161 |
| 2004/0060807 A1 * | 4/2004 | Nishimoto | ........... | H01H 25/041 |
| | | | | 200/553 |
| 2009/0225027 A1 * | 9/2009 | Itoh | ............... | G05G 1/02 |
| | | | | 345/161 |
| 2010/0011903 A1 * | 1/2010 | Koschke | ............... | B62D 1/12 |
| | | | | 74/524 |
| 2012/0061225 A1 * | 3/2012 | Fujikawa | ........... | F16H 59/105 |
| | | | | 200/5 R |
| 2012/0080294 A1 | 4/2012 | Ishikawa et al. | | |

* cited by examiner

FORCE-FEEDBACK PLANE SLIDE INPUT DEVICE

CLAIM OF PRIORITY

This application claims benefit of Japanese Patent Application No. 2013-027447 filed on Feb. 15, 2013, which is hereby incorporated by reference.

BACKGROUND OF THE INVENTION

1. Field of the Invention

The present invention relates to a force-feedback plane slide input device, and more particularly relates to a force-feedback plane slide input device which can be manufactured at lower costs.

2. Description of the Related Art

A driver of a vehicle may manually operate an operation knob of an in-vehicle controller while driving, to perform function adjustment or the like of a car air-conditioner, car audio, car navigation device, or the like. Nowadays, there are cases where a force-feedback plane slide input device is employed as an input device configured to perform such operations. The force-feedback plane slide input device may be configured to allow a driver to have a good feel of operation by feeding back external force (sense of force) such as resistance, thrust, or the like according to the amount or direction of operation of the operation knob, thereby causing the driver to surely perform a desired operation. Such a force-feedback plane slide input device is described in Japanese Unexamined Patent Application Publication No. 2012-79620.

Hereinafter, description will be made regarding the force-feedback plane slide input device according to Japanese Unexamined Patent Application Publication No. 2012-79620, with reference to FIGS. 12A and 12B. FIGS. 12A and 12B are schematic views illustrating a portion of the force-feedback plane slide input device according to Japanese Unexamined Patent Application Publication No. 2012-79620. FIG. 12A is a schematic plan view illustrating a portion of the force-feedback plane slide input device, and FIG. 12B is a schematic side view illustrating a portion of the force-feedback plane slide input device as viewed from the direction of Y2 in FIG. 12A. Note that, in order to simplify description, the layout of components in FIGS. 12A and 12B differs from the layout of actual components. Also, in order to simplify description, FIG. 12B illustrates only an actuating body 914 and a slider 903.

The force-feedback plane slide input device 900 according to Japanese Unexamined Patent Application Publication No. 2012-79620 includes, as illustrated in FIGS. 12A and 12B, the slider 903 configured to be operable by an operator via the operation knob. The operation knob is disposed such that the slider 903 can be slid over a plane including an X axis and a Y axis which are orthogonal to each other, that is to say in X-axis and Y-axis directions, in accordance with operations of the operator. Further, the force-feedback plane slide input device 900 includes the actuating body 914 further including an engagement pin 914a, an actuating body 915 further including an engagement pin 915a, and an actuating body 916 further including an engagement pin 916a. Each of the engagement pins 914a, 915a, and 916a is engaged with the slider 903. The actuating bodies 914, 915, and 916 are configured to turn in accordance with movement of the slider 903. Note that each of the actuating bodies 914, 915, and 916 includes another part having gear teeth formed at the side face. The actuating bodies 914, 915, and 916 are formed by disposing the respective parts in an overlaid manner. Further, the actuating bodies 914 and 915 turn in accordance with movement of the slider 903 in the X-axis direction, and the actuating body 916 turns in accordance with movement of the slider 903 in the Y-axis direction. In addition, the actuating bodies 914, 915, and 916 have a function of preventing the slider 903 from being rotated at the time of operating, by being engaged with the slider 903 at the three locations of the engagement pins 914a, 915a, and 916a.

SUMMARY OF THE INVENTION

However, the force-feedback plane slide input device 900 includes the actuating bodies 914, 915, and 916, each of which is composed of, as illustrated in FIG. 12B, three overlaid plate-shaped parts, and therefore the costs tend to be high with a great number of components.

The present invention aims to provide a force-feedback plane slide input device which can be manufactured at lower costs.

According to an aspect of the present invention, a force-feedback plane slide input device includes: a base body having a housing space formed in a rectangular shape in plan view; a slider disposed within the housing space and configured to be slidable along a plane including a first direction and a second direction which are orthogonal to each other; an operation member integrally formed with the slider; a first actuating member including a first engagement portion configured to be rotated by sliding movement of the operation member in the first direction; a second actuating member including a second engagement portion configured to be rotated by sliding movement of the operation member in the second direction; and a force-feedback unit configured to feed back a sense of force acting in the planar direction to an operator via the operation member. The slider includes a first slider member configured to move in the first direction, and a second slider member configured to move in the second direction. A length of an edge in the first direction of the housing space is substantially the same as a width in the first direction of the second slider member.

In the force-feedback plane slide input device, the first actuating member may include a first base portion having an approximate fan shape in plan view and formed as a flat plate, and a first rotating shaft serving as the center of rotation. A first gear portion may be formed on a side face corresponding to an arc-shaped edge of the first base portion having the approximate fan shape. The first engagement portion may be formed on one face of the first base portion so as to protrude from the arc-shaped edge side of the approximate fan shape. A first rotating center hole may be formed at a central angle side of the approximate fan shape of the first base portion. The first rotating shaft may be turnably inserted through the first rotating center hole. The second actuating member may include a second base portion having an approximate fan shape in plan view and formed as a flat plate, and a second rotating shaft serving as the center of rotation. A second gear portion may be formed on a side face corresponding to an arc-shaped edge of the second base portion having the approximate fan shape. The second engagement portion may be formed on one face of the second base portion so as to protrude from the arc-shaped edge side of the approximate fan shape. A second rotating center hole may be formed at a central angle side of the approximate fan shape of the second base portion. The second rotating shaft may be turnably inserted through the second rotating center hole.

The force-feedback plane slide input device may further include spacers configured to be engaged with the first rotating shaft and the second rotating shaft. The first rotating shaft may be formed in an approximate cylinder shape, including a first recessed portion formed in a recessed shape along the outer circumference of the first rotating shaft at a portion protruding from the first base portion of the first actuating member, the first recessed portion being formed in a tapered shape so that the diameter increases as the distance from the first base portion increases. The second rotating shaft may be formed in an approximate cylinder shape, including a second recessed portion formed in a recessed shape along the outer circumference of the second rotating shaft at a portion protruding from the second base portion of the second actuating member, the second recessed portion being formed in a tapered shape so that the diameter increases as the distance from the second base portion increases. The spacers may be engaged with the first recessed portion and the second recessed portion so as to be bent along the shapes defined by the inner portions of the first recessed portion and the second recessed portion, and the outer circumferential end portion of the spacers being pressed into contact with the first base portion and the second base portion.

According to this aspect of the present invention, the slider is composed of the first slider member movable in the first direction and the second slider member movable in the second direction. In addition, the length of the edge of the housing space in the first direction is configured to be substantially the same as the width of the second slider member in the first direction. According to such a configuration, the slider is guided by the inner wall of the housing space and slides on the plane. Thus, the slider may be prevented from being rotated at the time of operation. Accordingly, rotation of the slider does not have to be prevented by engaging the slider at the three locations as with the engagement pins 914a, 915a, and 916a according to the related art. The function handled by the three parts of the actuating bodies 914, 915, and 916 may be handled by two parts of the first actuating member and second actuating member. Therefore, reduction in the number of components can reduce the costs, thereby resulting in an advantage of providing a force-feedback plane slide input device of which manufacturing costs can be reduced.

According to the related art, the actuating bodies 914, 915, and 916 which are parts having a function similar to the function of the first actuating member and second actuating member have each been formed by disposing a member having gear teeth formed at the side face in an overlaid manner. According to the present invention, the first actuating member and second actuating member may be configured by providing the first gear portion to the side face of the first flat portion and providing the second gear portion to the side face of the second flat portion. Thus, the members having gear teeth formed at the side face are not needed, the number of parts can further be reduced, and the costs can be further reduced. Also, according to the related art, the member having gear teeth formed at the side face is disposed being overlaid with another member. The first actuating member and second actuating member according to the aspect of the present invention may be configured by providing the first gear portion to the side face of the first flat portion and providing the second gear portion to the side face of the second flat portion, whereby the height can be reduced. Accordingly, as an advantage a force-feedback plane slide input device can be provided regarding which the costs can be further reduced and the product height can be reduced.

According to the force-feedback plane slide input device of the aspect of the present invention, upon the spacer engaging with the first recessed portion in a state in which one end side of the first rotating shaft protrudes from the first base portion, the spacer may bend along the shape defined by the inner portion of the first recessed portion, and accordingly, the outer circumferential end portion of the spacer may be pressed into contact with the first base portion. Accordingly, the first rotating shaft and first base portion can be engaged without looseness, smooth operation can be performed, and chattering sounds can be prevented from occurring, even in the case where the device is subjected to vibration. Note that the same advantage can also be obtained by engaging the spacer with the second recessed portion of the second rotating shaft.

Thus, according to the present invention, a force-feedback plane slide input device can be provided of which manufacturing costs can be reduced.

BRIEF DESCRIPTION OF THE DRAWINGS

FIG. 3A is a perspective view illustrating the external appearances of the first actuating member and second actuating member.

DESCRIPTION OF THE PREFERRED EMBODIMENTS

First Embodiment

Figure 1:
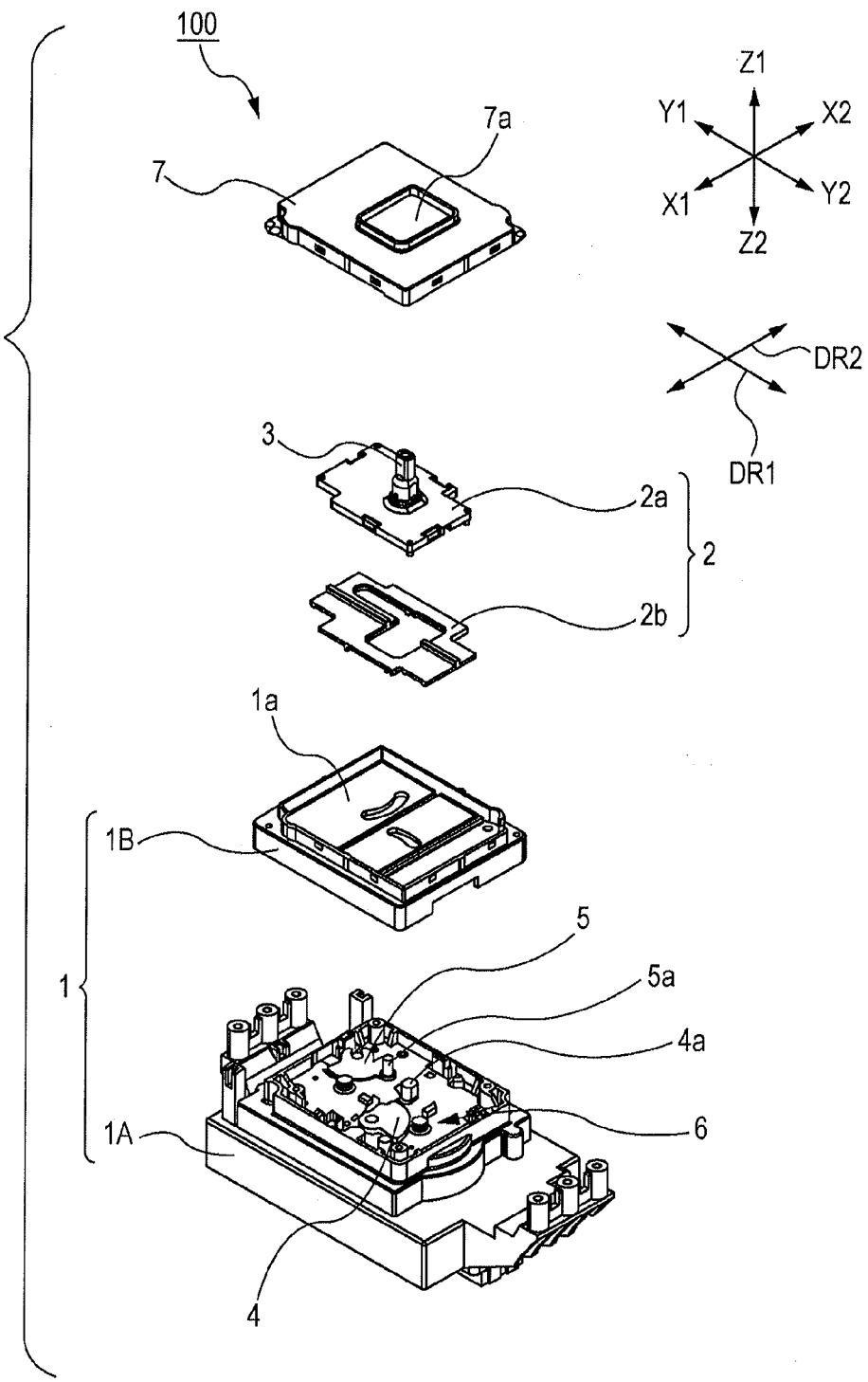
FIG. 1 is an exploded perspective view illustrating a configuration of a force-feedback plane slide input device according to a first embodiment.
Figure 2:
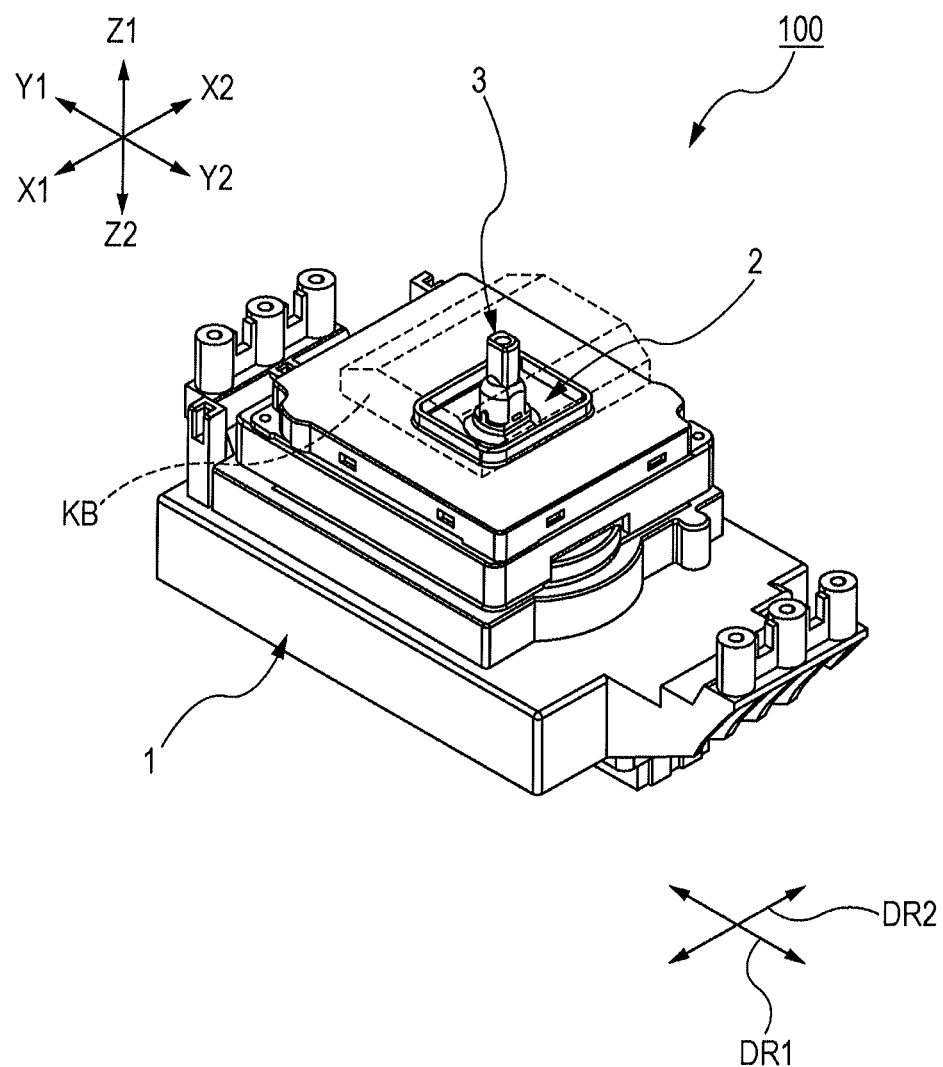
FIG. 2 is a perspective view illustrating an external appearance of the force-feedback plane slide input device according to the first embodiment.
Figure 3A:
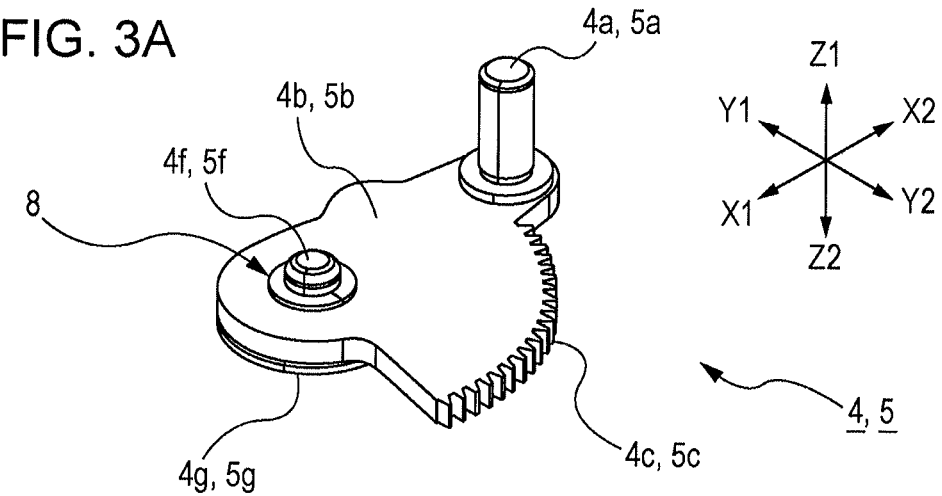
FIGS. 3A to 3C are diagrams illustrating external appearances of a first actuating member and a second actuating member according to the first embodiment, where
Figure 3B:
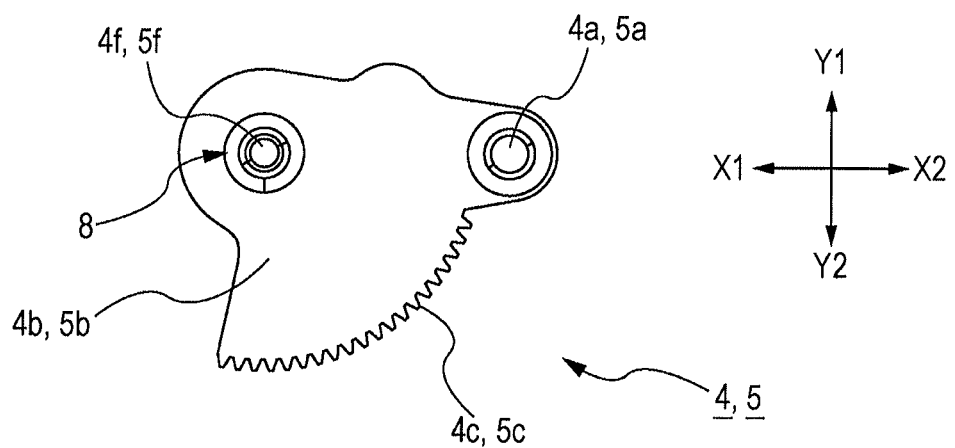
Figure 3C:
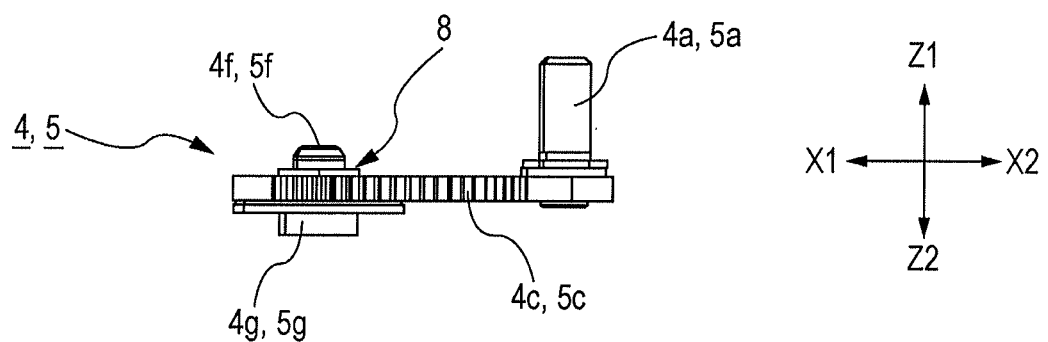
Figure 4:
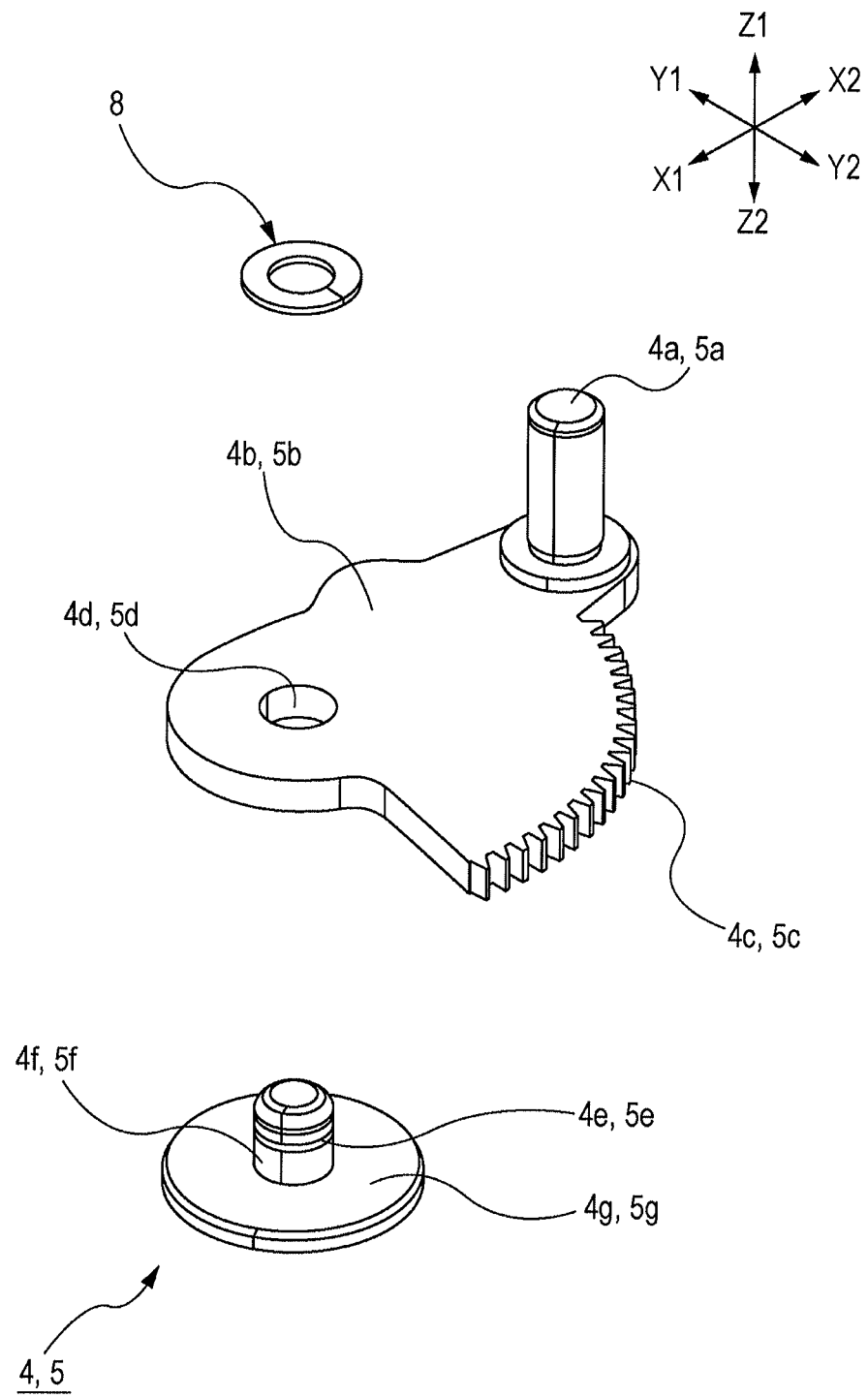
FIG. 4 is an exploded perspective view illustrating configurations of the first actuating member and second actuating member according to the first embodiment.
Figure 5:
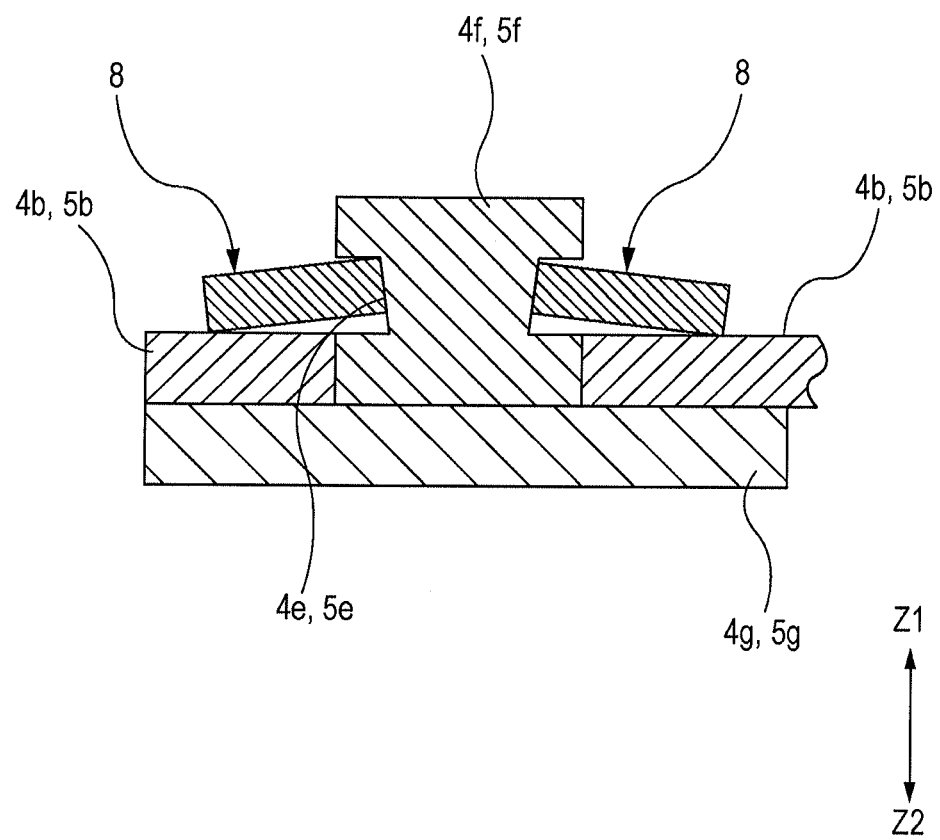
FIG. 5 is a schematic cross-sectional view illustrating an engagement status between a first recessed portion or second recessed portion and a spacer in the first embodiment.
Figure 6A:
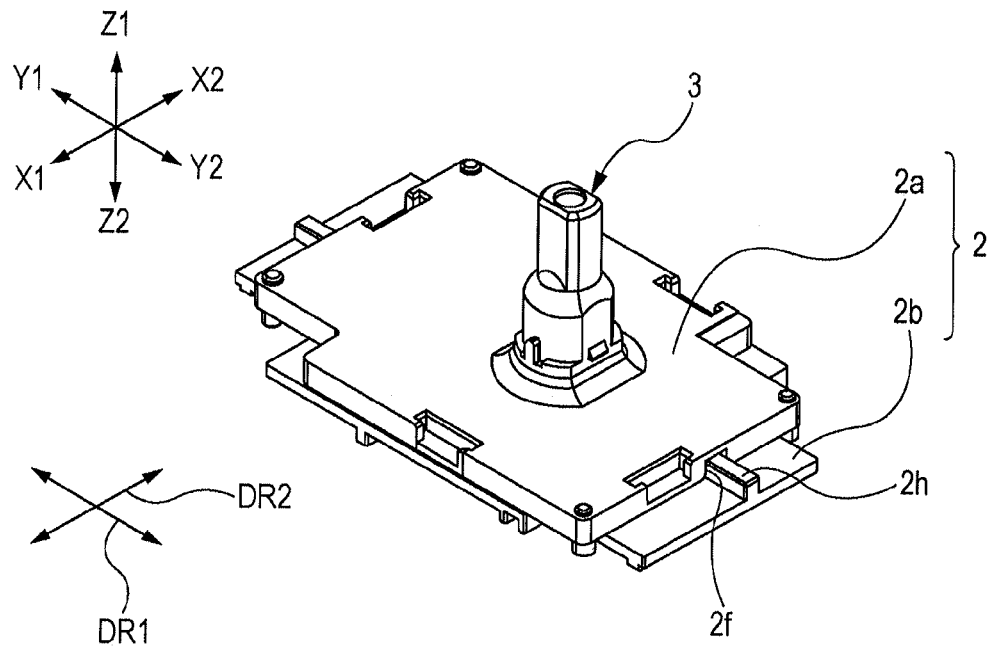
FIGS. 6A and 6B are diagrams illustrating an external appearance of a slider according to the first embodiment.
Figure 6B:
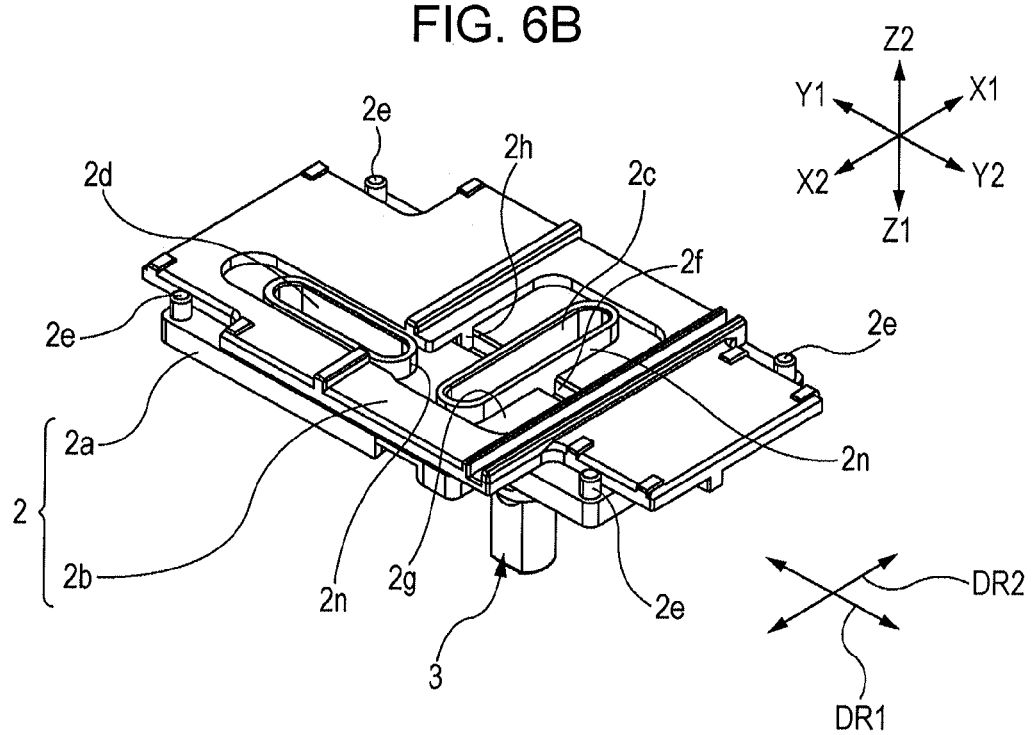
Figure 7A:
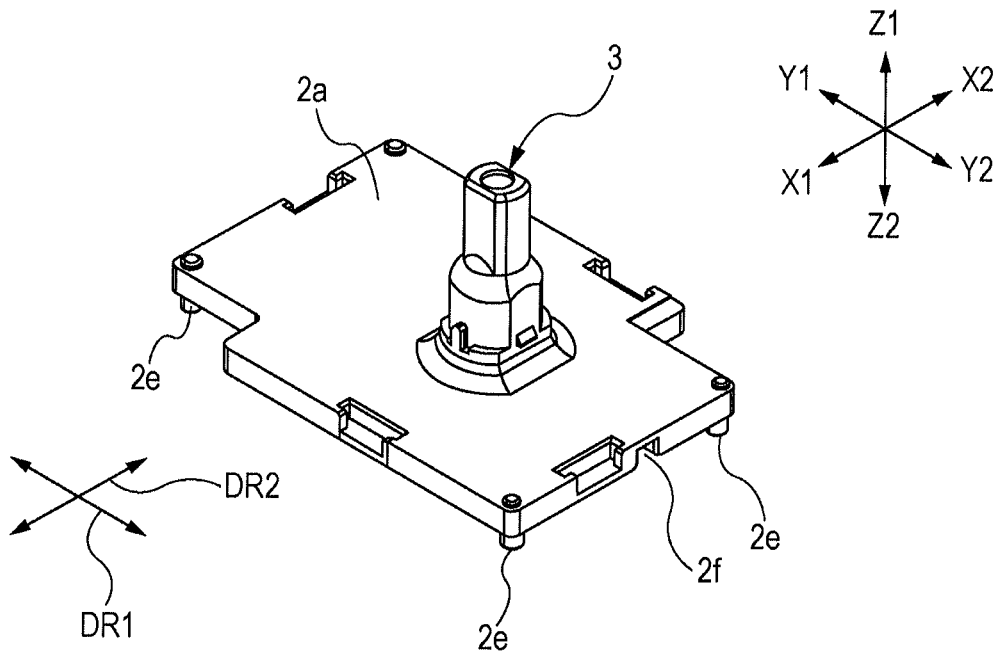
FIGS. 7A and 7B are diagrams illustrating an external appearance of a first slider member according to the first embodiment.
Figure 7B:
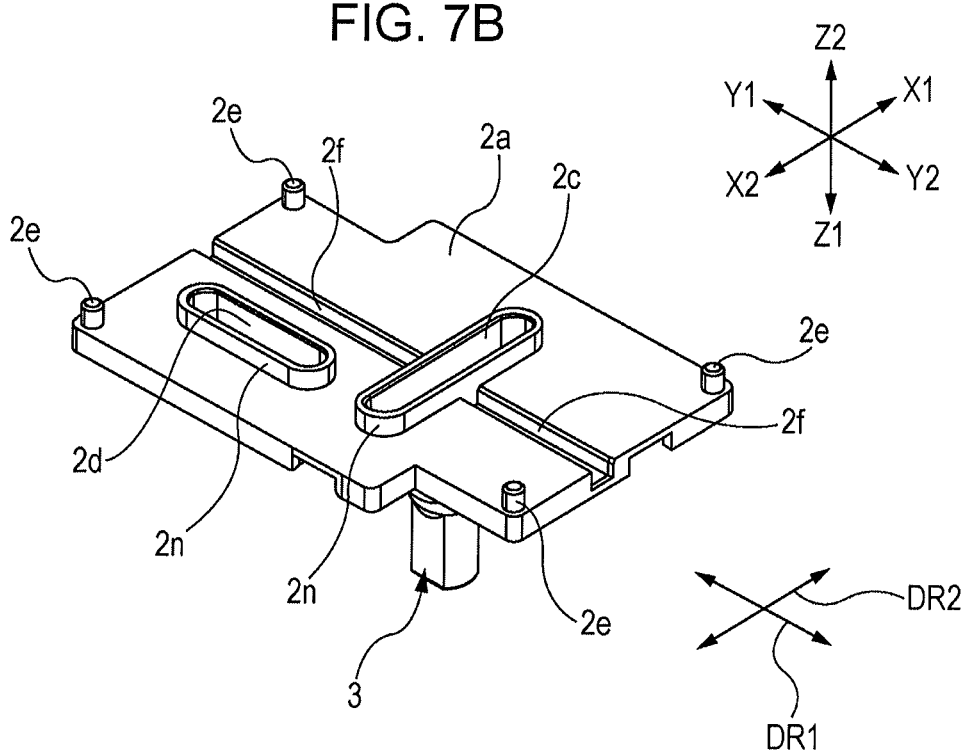
Figure 8A:
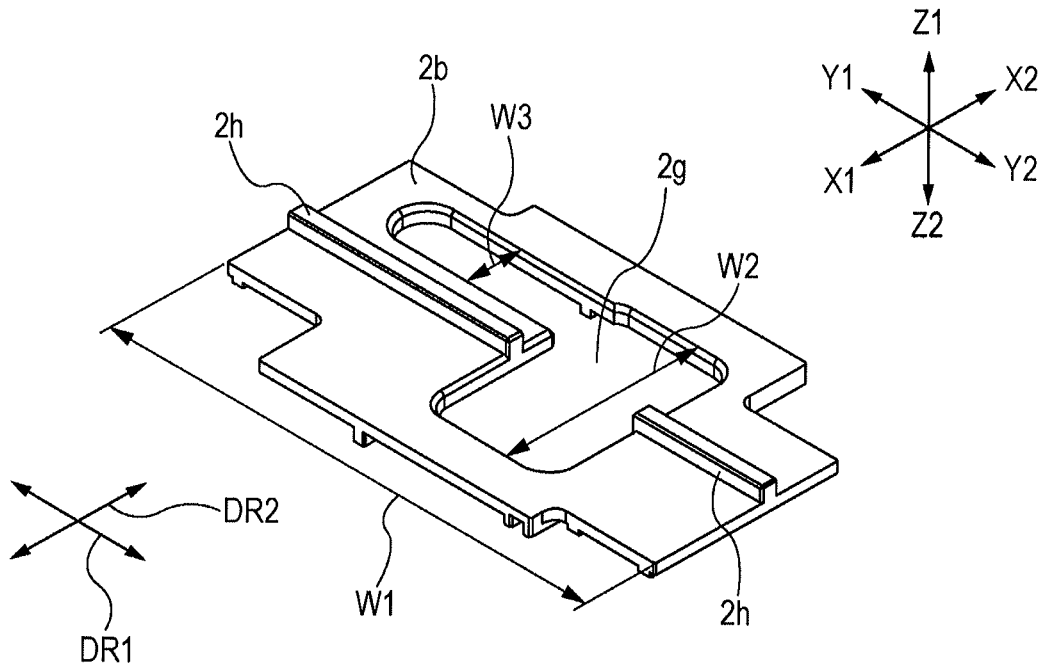
FIGS. 8A and 8B are diagrams illustrating an external appearance of a second slider member according to the first embodiment.
Figure 8B:
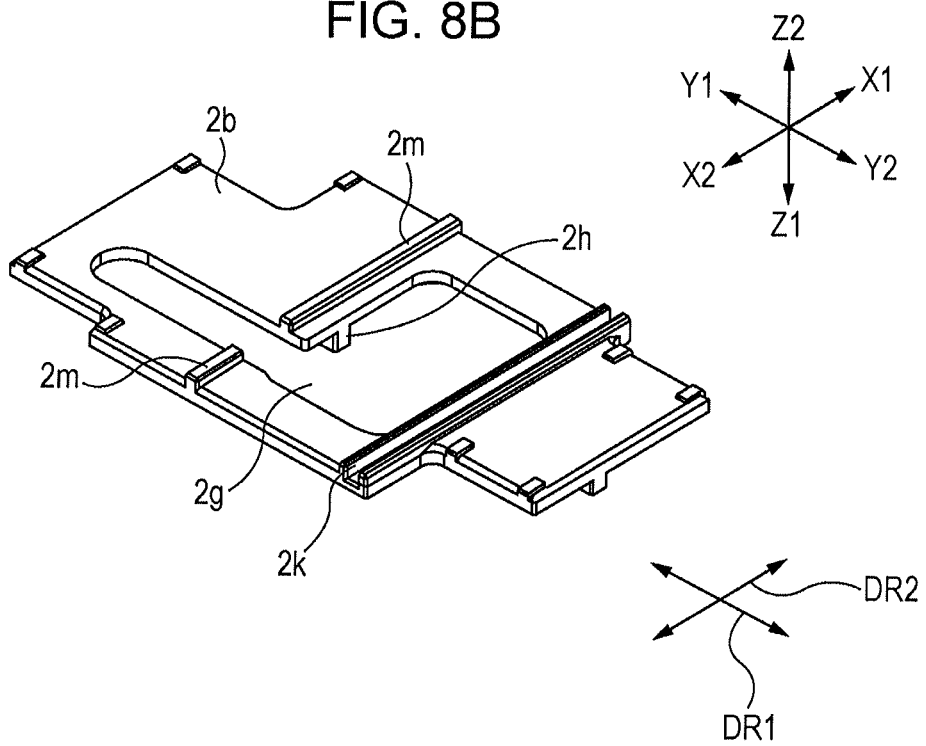
Figure 9A:
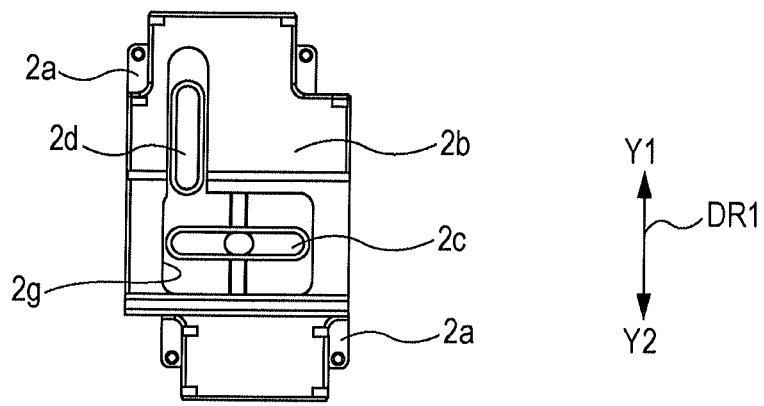
FIGS. 9A to 9C are plan views illustrating movement of the first slider member with respect to the second slider member in the first embodiment.
Figure 9B:
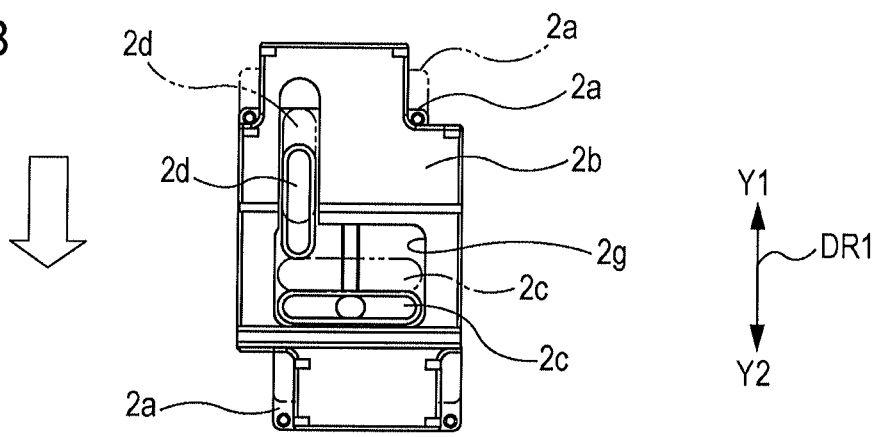
Figure 9C:
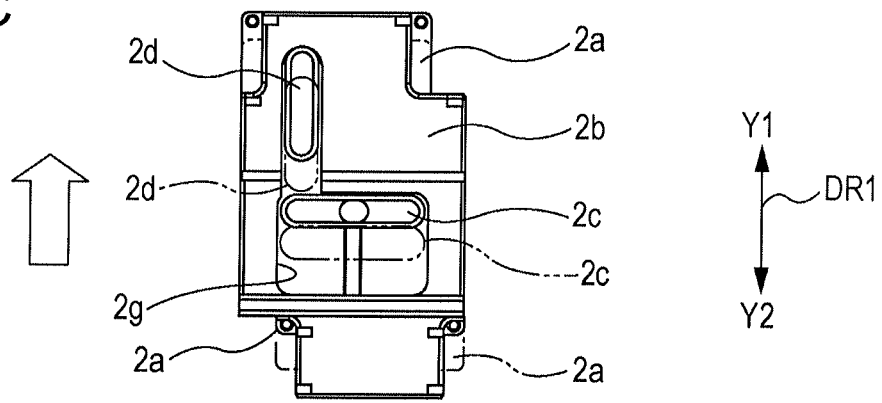
Figure 10:
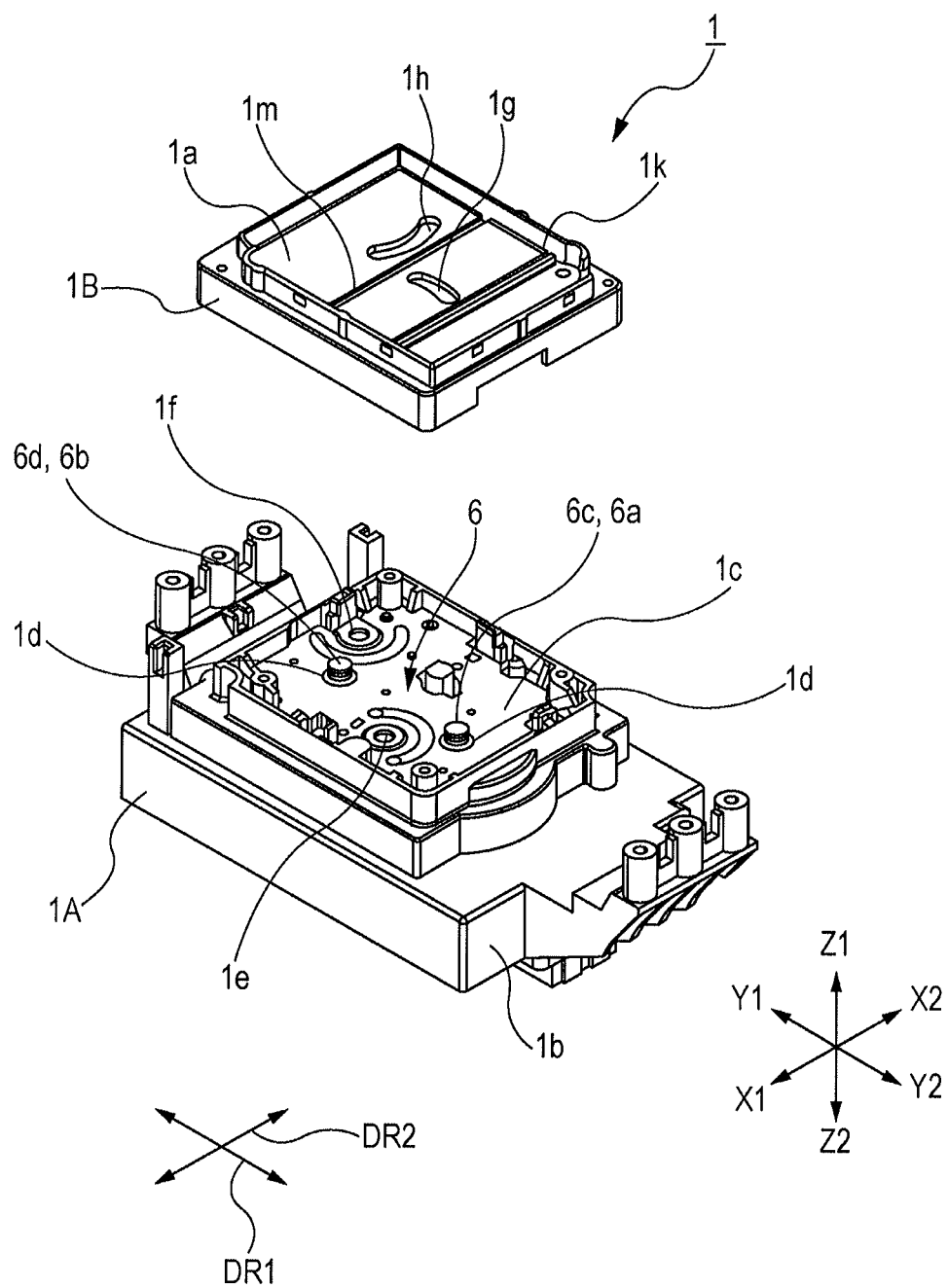
FIG. 10 is an exploded perspective view illustrating a configuration of a base body in which a force-feedback unit according to the first embodiment is disposed.

Hereinafter, a force-feedback plane slide input device according to a first embodiment will be described. First, description will be made regarding a configuration of a force-feedback plane slide input device 100 according to the present embodiment, with reference to FIGS. 1 to 10. FIG. 1 is an exploded perspective view illustrating the configuration of the force-feedback plane slide input device 100 according to the first embodiment. FIG. 2 is a perspective view illustrating an external appearance of the force-feedback plane slide input device 100 according to the first embodiment. FIGS. 3A to 3C are diagrams illustrating external appearances of a first actuating member 4 and a second actuating member 5 according to the first embodiment. More particularly, FIG. 3A is a perspective view illustrating the external appearances of the first actuating member 4 and second actuating member 5. FIG. 3B is a plan view illustrating the external appearances of the first actuating member 4 and second actuating member 5 in a state viewed from a Z1 direction side illustrated in FIG. 3A. FIG. 3C is a side view illustrating the external appearances of the first actuating member 4 and second actuating member 5 in a state viewed from a Y2 direction side illustrated in FIG. 3A. FIG. 4 is an exploded perspective view illustrating configurations of the first actuating member 4 and second actuating member 5 according to the first embodiment. FIG. 5 is a schematic cross-sectional view illustrating an engagement status between a first recessed portion 4e or second recessed portion 5e and a spacer 8 in the first embodiment. FIGS. 6A and 6B are diagrams illustrating an external appearance of a slider 2 according to the first embodiment. More particularly, FIG. 6A is a perspective view illustrating the external appearance of the slider 2, and FIG. 6B is a perspective view illustrating the external appearance of the slider 2 in a state viewed from a Z2 direction side illustrated in FIG. 6A. FIGS. 7A and 7B are diagrams illustrating an external appearance of a first slider member 2a according to the first embodiment. More particularly, FIG. 7A is a perspective view illustrating the external appearance of the first slider member 2a and FIG. 7B is a perspective view illustrating the external appearance of the first slider member 2a in a state viewed from the Z2 direction side illustrated in FIG. 7A. FIGS. 8A and 8B are diagrams illustrating an external appearance of a second slider member 2b according to the first embodiment. More particularly, FIG. 8A is a perspective view illustrating the external appearance of the second slider member 2b, and FIG. 8B is a perspective view illustrating the external appearance of the second slider member 2b in a state viewed from the Z2 direction side illustrated in FIG. 8A. FIGS. 9A to 9C are plan views illustrating movement of the first slider member 2a with respect to the second slider member 2b in the first embodiment. More particularly, FIG. 9A is a plan view illustrating a state in which the first slider member 2a is in a reference position. FIG. 9B is a plan view illustrating a state in which the first slider member 2a has moved in the Y2 direction from the reference position. FIG. 9C is a plan view illustrating a state in which the first slider member 2a has moved in a Y1 direction from the reference position. FIG. 10 is an exploded perspective view illustrating a configuration of a base body 1 in which a force-feedback unit 6 according to the first embodiment is disposed.

The force-feedback plane slide input device 100 includes, as illustrated in FIG. 1, a base body 1, a slider 2, an operation member 3, a first actuating member 4, a second actuating member 5, a force-feedback unit 6, and a cover member 7. As illustrated in FIG. 2, the operation member 3 is provided protruding outward in an operable manner. Note that, in order to facilitate operation of the operation member 3 in actual use, such an operation knob KB as indicated by a dashed line in FIG. 2, for example, is attached to the tip of the operation member 3.

The first actuating member 4 may include, as illustrated in FIGS. 3A to 3C, a first base portion 4b formed as a flat plate having an approximate fan shape in plan view, a first rotating shaft 4f, a first engagement portion 4a, and a spacer 8. The first base portion 4b may be made of a synthetic resin material, and have a first gear portion 4c formed at the side face corresponding to an arc-shaped edge of the approximate fan shape, as illustrated in FIG. 4. Further, the first engagement portion 4a may be formed on one face (face in the Z1 direction side) of the first base portion 4b so as to protrude from the arc-shaped edge side of the approximate fan shape. Note that, in the case of the present embodiment, the first engagement portion 4a is disposed on one end side (X2 direction side) of the arc-shaped edge of the approximate fan shape. Further, a first rotating center hole 4d, which is a circular through hole, may be formed at a central angle side of the approximate fan shape of the first base portion 4b.

The first rotating shaft 4f may be made of a synthetic resin material, and formed in an approximate cylindrical shape, such that the first rotating shaft 4f can be inserted into the first rotating center hole 4d. Also, the first rotating shaft 4f may include, on one end thereof (on the side in the Z2 direction), a disc-shaped first attachment portion 4g having a diameter larger than the diameter of the first rotating center hole 4d. The first rotating shaft 4f may also include, on the other end thereof, a first recessed portion 4e formed in a recessed shape along the outer circumference of the first rotating shaft 4f. The length of the first rotating shaft 4f may be longer than the length of the first rotating center hole 4d. The first recessed portion 4e may be formed on the other end of the first rotating shaft 4f with a distance from the first attachment portion 4g to the position, where the first recessed portion 4e is formed, being approximately the same as the length of the first rotating center hole 4d.

The spacer 8 may be made of a metal or synthetic resin material, and configured as a toric flat plate having elasticity. Note that an opening at the center portion may have a size engageable with the first recessed portion 4e of the first rotating shaft 4f.

As illustrated in FIGS. 3A to 3C, the first rotating shaft 4f may be turnably inserted through the first rotating center hole 4d from the bottom face side (face on the Z2 direction side) of the first base portion 4b. The spacer 8 may be engaged with the first recessed portion 4e formed in the first rotating shaft 4f protruding from the upper face of the first base portion 4b. Thus, the first actuating member 4 may be configured to allow the first base portion 4b to be turned with the first rotating shaft 4f as the center. Note that, as illustrated in FIG. 5, the first recessed portion 4e may be formed in a tapered shape where the diameter increases as the distance from the first base portion 4b increases. Therefore, the spacer 8 attached to the first recessed portion 4e may be engaged with the first recessed portion 4e such that the spacer is bent along the shape defined by the inside of the first recessed portion 4e, and such that the outer circumferential end portion of the spacer 8 is pressed into contact with the first base portion 4b.

The second actuating member 5 may be a component having the same shape as the first actuating member 4, and accordingly, detailed description will be omitted. As illustrated in FIGS. 3A to 3C, the second actuating member 5 may include a second base portion 5b equivalent to the first base portion 4b of the first actuating member 4, a second rotating shaft 5f equivalent to the first rotating shaft 4f, a second engagement portion 5a equivalent to the first engagement portion 4a, and a spacer 8. As illustrated in FIG. 4, the second base portion 5b may include a second gear portion 5c equivalent to the first gear portion 4c of the first actuating member 4, a second engagement portion 5a equivalent to the first engagement portion 4a, and a second rotating center hole 5d equivalent to the first rotating center hole 4d. The second rotating shaft 5f may include a second attachment portion 5g equivalent to the first attachment portion 4g of the first actuating member 4, and a second recessed portion 5e equivalent to the first recessed portion 4e.

As illustrated in FIGS. 3A to 3C, the second rotating shaft 5f may be turnably inserted through the second rotating center hole 5d from the bottom face side (face on the Z2 direction side) of the second base portion 5b. The spacer 8 may be engaged with the second recessed portion 5e formed in the second rotating shaft 5f protruding from the upper face of the second base portion 5b. Thus, the second actuating member 5 may be configured to allow the second base portion 5b to be turned with the second rotating shaft 5f as the center. Note that, as illustrated in FIG. 5, the second recessed portion 5e may be formed in a tapered shape where the diameter increases as the distance from the second base portion 5b increases, in the same way as with the first recessed portion 4e. Therefore, the spacer 8 attached to the second recessed portion 5e may bend along the shape defined by the shape of the second recessed portion 5e, such that the outer circumferential end portion thereof is pressed into contact with the second base portion 5b.

The operation member 3 is made of a synthetic resin material, and formed in a columnar shape as illustrated in FIGS. 6A and 6B.

The slider 2 is made of a synthetic resin material, and includes a first slider member 2a and a second slider member 2b, as illustrated in FIGS. 6A and 6B. The slider 2 is formed by disposing the second slider member 2b in a manner overlaid by the first slider member 2a. Also, the slider 2 thus formed has an approximately rectangular shape in plan view (as viewed from the Z2 direction). Note that in the present embodiment, the operation member 3 is formed integrally with the slider 2 by injection molding, and the operation member 3 is formed protruding on one face (Z1 direction side) that is opposite to another face of the first slider member 2a facing the second slider member 2b.

As illustrated in FIG. 7A, the first slider member 2a is formed in an approximately rectangular plate shape, and the operation member 3 is formed protruding at the central portion of the upper face (face in the Z1 direction side). Further, as illustrated in FIG. 7B, the first slider member 2a includes on the rear face thereof a first guide groove 2c formed extending in a second direction DR2 into which the first engagement portion 4a can be inserted, and a second guide groove 2d formed extending in a first direction DR1 into which the second engagement portion 5a can be inserted. Note that the first guide groove 2c and second guide groove 2d are formed by having wall portions 2n protruding along these opening shapes. In addition, the first slider member 2a includes guide pins 2e formed protruding in a columnar shape at the four corners of the lower face thereof. Further, the first slider member 2a includes a first rail groove 2f formed in a recessed shape from one end to the other end in the first direction DR1 (Y1-Y2 direction) of the lower face, straddling the first guide groove 2c.

As illustrated in FIGS. 8A and 8B, the second slider member 2b is formed in an approximately rectangular plate form. Furthermore, the second slider member 2b is formed to have approximately the same width (W1) in the first direction DR1 (Y1-Y2 direction) as the length of the housing space 1a in the first direction DR1 (Y1-Y2 direction) The second slider member 2b includes a restriction hole 2g corresponding to the first guide groove 2c and second guide groove 2d. The width dimension (W2) of the restriction hole 2g in the second direction DR2 at a portion corresponding to the first guide groove 2c is substantially the same as the width dimension in the second direction DR2 of the wall portion 2n of the first guide groove 2c. The width dimension (W3) of the restriction hole 2g in the second direction DR2 at a portion corresponding to the second guide groove 2d is substantially the same as the width dimension in the second direction DR2 of the wall portion 2n of the second guide groove 2d. Note that the restriction hole 2g is formed to have a width dimension in the first direction DR1 at a portion that corresponds to the first guide groove 2c greater than that of the wall portion 2n of the first guide groove 2c, and to have a width dimension in the first direction DR1 at a portion that corresponds to the second guide groove 2d greater than that of the wall portion 2n of the second guide groove 2d. Furthermore, the second slider member 2b is formed to have approximately the same width dimension in the second direction D2 at both ends thereof along the first direction DR1, as the dimension of the interval between the guide pins 2e arranged in parallel in the second direction DR2 on the first slider member 2a. Such a configuration allows the second slider member 2b to be disposed between the guide pins 2e arrayed in the second direction DR2. Also, the second slider member 2b includes a first rail portion 2h formed in a protruding shape from one end to the other end in the first direction DR1 on the upper face (face in the Z1 direction side), straddling the restriction hole 2g. Note that the width dimension of the first rail portion 2h is substantially the same as the width dimension of the first rail groove 2f, and the first rail portion 2h can be inserted into the first rail groove 2f. Also, the second slider member 2b includes a second rail portion 2m formed in a protruding shape extending from one end to the other end in the second direction DR2 (X1-X2 direction) on the side opposite to the portion of the restriction hole 2g that corresponds to the first guide groove 2c along the first direction DR1 (Y1 direction). Note that the second rail portion 2m is formed straddling the portion of the restriction hole 2g corresponding to the second guide groove 2d. Also, the second slider member 2b includes a second rail groove 2k formed in a recessed shape from one end to the other end in the second direction DR2, at a position facing the second rail portion 2m across the portion of the restriction hole 2g corresponding to the first guide groove 2c.

The first slider member 2a and second slider member 2b are disposed in an overlaid manner so that the first guide groove 2c and second guide groove 2d are inserted into the restriction holes 2g, and the first rail portion 2h is inserted into the first rail groove 2f. Thus, the slider 2 such as illustrated in FIGS. 6A and 6B is formed. Note that the guide pins 2e of the first slider member 2a are disposed such that the region of the second slider member 2b between both edges in the second direction DR2 is placed therebetween at both ends of the second slider member 2b in the first direction. The first slider member 2a and the second slider member of the slider 2 thus formed can be moved in the first direction DR1 (Y1-Y2 direction) in a range restricted by the first guide groove 2c, second guide groove 2d, and restriction hole 2g, as illustrated in FIGS. 9A through 9C. Taking the position illustrated in FIG. 9A as a reference position, the first slider member 2a can be moved in the Y2 direction as illustrated in FIG. 9B, and can be moved in the Y1 direction as illustrated in FIG. 9C.

The force-feedback unit 6 is, as illustrated in FIG. 10, composed of a first motor 6a and a second motor 6b of which the shafts can be rotated by supplying power thereto, though detailed description will be omitted. The first motor 6a includes a first transmission member 6c formed in a cylindrical shape at the tip of the shaft. A gear, which can be engaged with the first gear portion 4c of the first actuating member 4, is formed on the outer circumferential face of the first transmission member 6c. The second motor 6b similarly includes a second transmission member 6d. A gear, which can be engaged with the second gear portion 5c of the second actuating member 5, is formed on the outer circumferential face of the second transmission member 6d.

The base body 1 is made of a synthetic resin material, and is composed of, as illustrated in FIG. 10, a lower case 1A and an upper case 1B each of which is formed in a box shape and the inside is hollow. The lower case 1A includes a base portion 1b formed in a box shape having a size which can accommodate the force-feedback unit 6. Also, the lower case 1A includes an attachment space 1c, surrounded in four directions (X1-X2 direction side and Y1-Y2 direction side), having the upward portion opened at the upper face of the base portion 1b (face on the Z1 direction side). A communication hole 1d into which the first transmission member 6c or second transmission member 6d can be inserted is formed at two predetermined positions of the inner bottom face of the attachment space 1c. In the case of the present embodiment, two communication holes 1d are respectively formed on one end side (y1 direction side) and the other end side (Y2 direction side) in the first direction DR1 along a straight line which equally divides the attachment space 1c into two in the second direction DR2, when viewing the attachment space 1c in plan view (from the Z1 direction). Also, a first attachment hole 1e in which the first attachment portion 4g of the first actuating member 4 can be inserted is formed in the vicinity of the communication hole 1d (Y2 direction side and X1 direction side) formed on the other end side in the first direction DR1. A second attachment hole 1f in which the second attachment portion 5g of the second actuating member 5 can be inserted is formed in the vicinity of the communication hole 1d (Y1 direction side and X2 direction side) formed on one end side in the first direction DR1.

As illustrated in FIG. 10, the upper case 1B is opened upwards, and the housing space 1a is formed in the inside thereof. The upper case 1B is formed having a size which can cover the attachment space 1c. A first turning hole 1g into which the first engagement portion 4a can be inserted, corresponding to the first engagement portion 4a, is formed on the inner bottom face of the housing space 1a in an arc shape centered on a portion corresponding to the first attachment hole 1e, on the X2 direction side of the portion corresponding to the first attachment hole 1e. Also, a second turning hole 1h into which the second engagement portion 5a can be inserted, corresponding to the second engagement portion 5a, is formed on the inner bottom face of the housing space 1a in an arc shape centered on a portion corresponding to the second attachment hole 1f, on the Y2 direction side of the portion corresponding to the second attachment hole 1f. Also, a third rail portion 1k is formed in a protruding shape across one end to the other end in the second direction DR2 on the inner bottom face of the housing space 1a. The third rail portion 1k is formed with a width dimension so as to be insertable into the second rail groove 2k of the slider 2. A third rail groove 1m formed in a recessed shape from one end to the other end in the second direction DR2 is formed on the Y1 direction side of the third rail portion 1k. The third rail groove 1m is formed with a width dimension such that the second rail portion 2m of the slider 2 is insertable thereinto. The separation distance between the third rail portion 1k and the third rail groove 1m generally agrees with the separation distance between the second rail groove 2k and second rail portion 2m of the slider 2.

The base body 1 is formed by arranging the upper case 1B such that it covers the upper portion of the attachment space 1c of the lower case 1A, and arranging the upper case 1B to have an orientation so as to be placed corresponding with the first engagement portion 4a and second engagement portion 5a. Note that the attachment space 1c, having the upper portion covered by the upper case 1B, has a space which allows the first actuating member 4 and second actuating member 5 to be housed.

The cover member 7 is made of a synthetic resin material, and, as illustrated in FIG. 1, formed as a hollow rectangular parallelepiped shape opened downwards. The cover member 7 has an operation opening portion 7a on its upper face, thereby allowing the operation member 3 to pass through. Note that the size of the upper face of the cover member 7 is a size whereby the housing space 1a of the base body 1 can be covered.

Figure 11A:
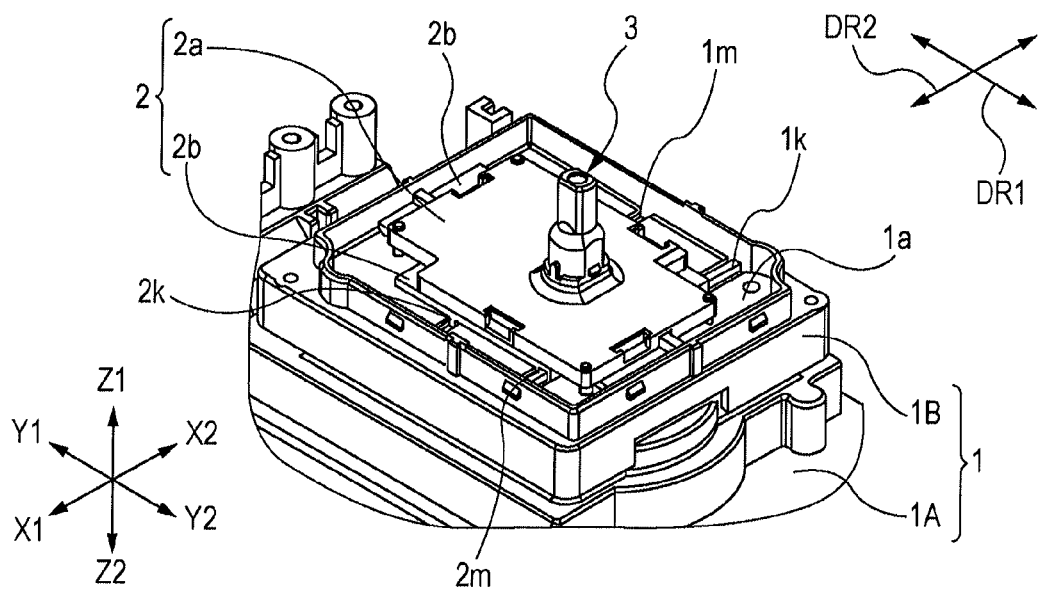
FIGS. 11A and 11B are diagrams illustrating a housing space in a state in which the slider according to the first embodiment is disposed.
Figure 11B:
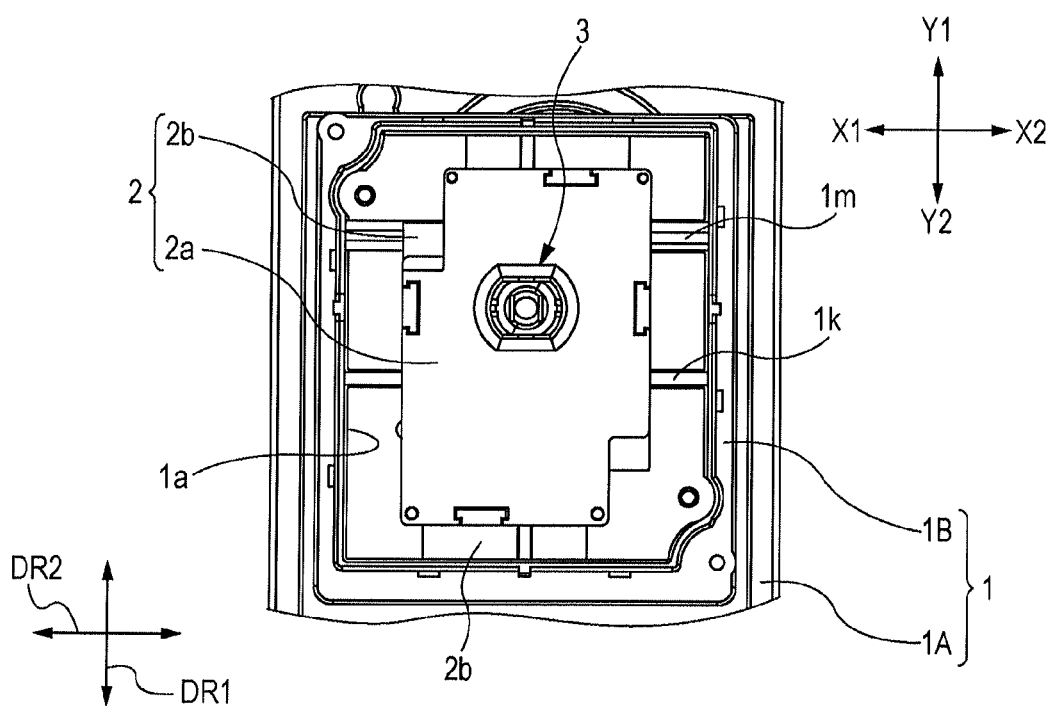
Figure 12A:
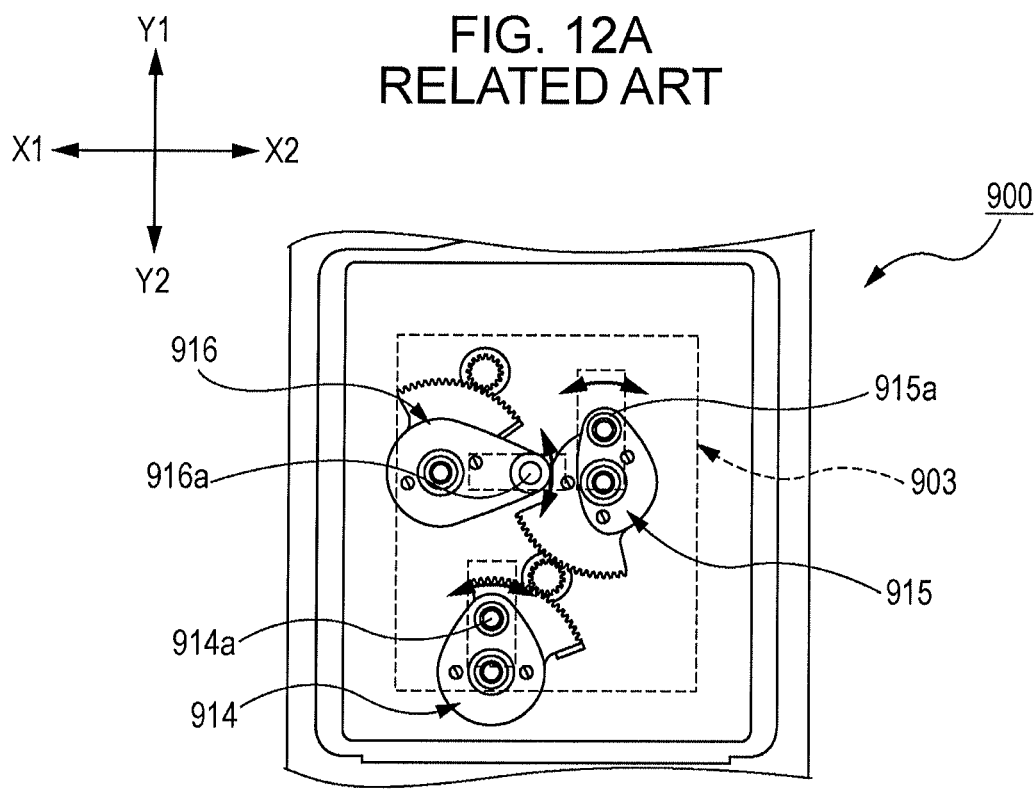
FIGS. 12A and 12B are schematic views illustrating a portion of a configuration of a force-feedback plane slide input device according to Japanese Unexamined Patent Application Publication No. 2012-79620.
Figure 12B:
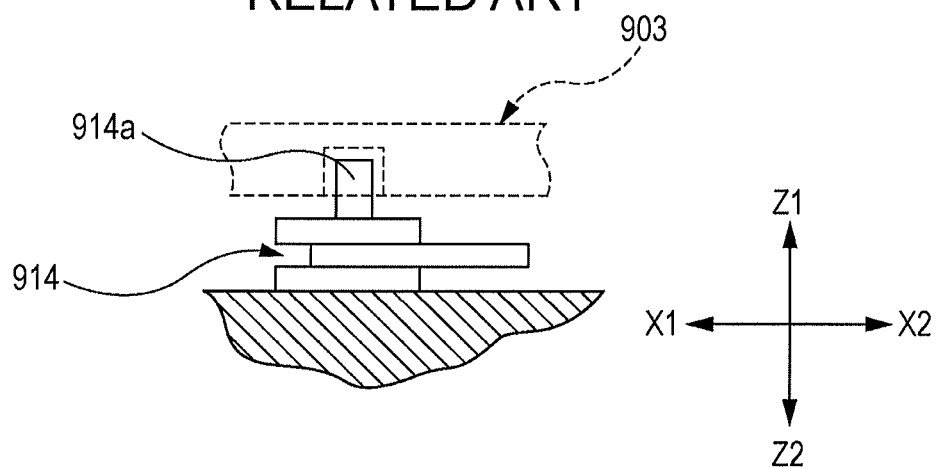

Description will be made next regarding the configuration of the force-feedback plane slide input device 100, with reference to FIGS. 1, 2, 10, and 11A and 11B. FIGS. 11A and 11B are diagrams illustrating the housing space 1a in a state in which the slider 2 according to the first embodiment is disposed. More particularly, FIG. 11A is a perspective view illustrating the housing space 1a in a state in which the slider 2 is disposed, and FIG. 11B is a plan view illustrating the housing space 1a in a state in which the slider 2 in a state viewed from the Z1 direction side illustrated in FIG. 11A is disposed.

As illustrated in FIG. 10, the force-feedback unit 6 is retained within the lower case 1A of the base body 1 by screws or the like. The first transmission member 6c of the first motor 6a of the force-feedback unit 6 thus retained protrudes to the attachment space 1c from the communication hole 1d formed on the first attachment hole 1e side. Also, the second transmission member 6d of the second motor 6b protrudes to the attachment space 1c from the communication hole 1d formed on the second attachment hole 1f side.

As illustrated in FIG. 1, the first actuating member 4 is locked by inserting the first attachment portion 4g into the first attachment hole 1e (see FIG. 10), and the second actuating member 5 is locked by inserting the second attachment portion 5g into the second attachment hole 1f (see FIG. 10). The first gear portion 4c of the first actuating member 4 thus disposed and the first transmission member 6c of the force-feedback unit 6 are engaged, and the second gear portion 5c of the second actuating member 5 thus disposed and the second transmission member 6d of the force-feedback unit 6 are engaged. Thus, the actuating power of the force-feedback unit 6 can be transmitted to the first actuating member 4 and second actuating member 5.

The upper case 1B is disposed over the attachment space 1c where the first actuating member 4 and second actuating member 5 are disposed, so as to cover the opening of the attachment space 1c, as illustrated in FIGS. 11A and 11B. At this time, the first engagement portion 4a of the first actuating member 4 (see FIG. 1) is inserted swingably along the first turning hole 1g (see FIG. 10), and the second engagement portion 5a of the second actuating member 5 (see FIG. 1) is inserted swingably along the second turning hole 1h (see FIG. 10). Also, the slider 2 is disposed in the housing space 1a slidably along a plane including the first direction DR1 and second direction DR2 which are orthogonal to each other, in a state in which the second rail portion 2m is inserted into the third rail groove 1m, and the third rail portion 1k is inserted into the second rail groove 2k. Note that at this time, the first engagement portion 4a of the first actuating member 4 protruding from the inner bottom face of the housing space 1a is inserted into the first guide groove 2c, and the second engagement portion 5a of the second actuating member 5 is inserted into the second guide groove 2d. Thus, the actuating power of the force-feedback unit 6 can be transmitted to the slider 2 via the first engagement portion 4a and second engagement portion 5a. Note that the first engagement portion 4a can be moved along the first guide groove 2c, and the second engagement portion 5a can be moved along the second guide groove 2d, respectively.

The cover member 7 is disposed over the housing space 1a in which the slider 2 is thus disposed, as illustrated in FIG. 2, in a state in which the operation member 3 is inserted into the operation opening portion 7a, so as to cover the opening. Thus, the force-feedback plane slide input device 100 is formed. Note that, though not illustrated in FIG. 2, the force-feedback plane slide input device 100 includes a detector capable of detecting turning of the first actuating member 4 and second actuating member 5. A turning angle is detected by a rotary variable resister or encoder or the like, for example.

Next, operation of the force-feedback plane slide input device 100 will be described. When applying force in the first direction DR1 to the operation member 3, the dimension in the first direction DR1 of the second slider member 2b is substantially the same as the dimension in the first direction DR1 of the housing space 1a, so the second slider member 2b does not move in the first direction DR1. However, as described above, the first slider member 2a and second slider member 2b are relatively movable in the first direction DR1, and accordingly, the first slider member 2a moves in the first direction DR1. Also, when applying force in the second direction DR2 to the operation member 3, the second slider member 2b moves in the second direction DR2 integrally with the first slider member 2a. Accordingly, the slider 2 includes the first slider member 2a which is movable in the first direction DR1, and the second slider member 2b which is movable in the second direction DR2, and is substantially capable of slidably moving along a plane including the first direction DR1 and second direction DR2 which are orthogonal to each other. Also, the first engagement portion 4a of the first actuating member 4 is rotated on the first rotating shaft 4f as the center of rotation, by sliding movement of the slider 2 in the first direction DR1 by the operation member 3. Also, the second engagement portion 5a of the second actuating member 5 is rotated on the second rotating shaft 5f as the center of rotation, by sliding movement of the slider 2 in the second direction DR2 by the operation member 3. The rotational angle of the first actuating member 4 or second actuating member 5 which is thus rotated is detected by a detector, and the position of the slider 2 is calculated from the rotation angle thereof, whereby input of the direction can be performed. Also, the force-feedback unit 6 is capable of transmitting actuating power to the slider 2 via the first actuating member 4 and second actuating member 5, and accordingly, a sense of force acting in the planar direction can be fed back to the operator from the slider 2 via the operation member 3. Feedback of a sense of force is to apply force resisting or countering operations, for example, to the operation member 3.

Hereinafter, advantages of the present embodiment will be described. The force-feedback plane slide input device 100 according to the present embodiment includes the base body 1 including the housing space 1a formed in a rectangular shape in plan view. The force-feedback plane slide input device 100 also includes the slider 2, which is disposed within the housing space 1a, and which is capable of slidably moving along the plane including the first direction DR1 and second direction DR2 which are orthogonal to each other. The force-feedback plane slide input device 100 further includes the operation member 3 integral with the slider 2, and the first actuating member 4 including the first engagement portion 4a which is rotated by sliding movement of the operation member 3 in the first direction DR1. The force-feedback plane slide input device 100 moreover includes the second actuating member 5 including the second engagement portion 5a which is rotated by sliding movement of the operation member 3 in the second direction DR2, and the force-feedback unit 6 capable of feeding back a sense of force acting in the planar direction to the operator via the operation member 3. The slider 2 includes the first slider member 2a capable of moving in the first direction DR1, and the second slider member 2b capable of moving in the second direction DR2. The length of the edge of the housing space 1a in the first direction DR1 is substantially the same as the width of the second slider member 2b in the first direction DR1.

According to this configuration, the second slider member 2b of the slider 2 slides in the second direction DR2 guided by the inner wall of the housing space 1a, while the first slider member 2a and second slider member 2b guide each other so that the first slider member 2a of the slider 2 slides on the second slider member 2b in the first direction DR1. Accordingly, the slider 2 slides on the plane. Thus, the second slider member 2b is guided by the inner wall of the housing space 1a, and the first slider member 2a is guided by the second slider member 2b. Thus, the slider 2 can be prevented from being rotated on the operation member 3 at the time of operating the slider 2, for example. Accordingly, rotation of the slider 2 does not have to be prevented by the slider 2 being engaged at three locations as with the engagement pins 914a, 915a, and 916a according to the related art. The function handled by the three parts which are the actuating bodies 914, 915, and 916, can be handled by the two parts which are the first actuating member 4 and second actuating member 5. Also, though each of the engagement pins 914a, 915a, and 916a according to the related art has been configured by overlaying three plate-shaped members, a single plate-shaped member (first base portion 4b, second base portion 5b) is employed in the present embodiment. Thus, costs can be reduced by reducing the number of parts. Also, the first actuating member 4 and second actuating member 5 are composed of the same shaped member, and accordingly, the same parts can be processed together, so the processing costs can be reduced. Accordingly, the processing costs for components are reduced, and the number of components is reduced, whereby the costs can be reduced, thereby providing a force-feedback plane slide input device which can be manufactured at lower costs.

Also, the advantage of rotation prevention has been provided using the engagement pins 914a, 915a, and 916a in the related art, and accordingly, there have been concerns regarding strength. However, the present embodiment prevents rotation of the slider 2 by guiding the slider 2 using the housing space 1a, and accordingly, an advantage is yielded in that strength of rotation prevention is higher than that in the related art.

Also, the engagement pins 914a, 915a, and 916a according to the related art have been configured by overlaying three plate-shaped members. However, the first actuating member 4 and second actuating member 5 according to the present embodiment are composed of a single plate-shaped member (first base portion 4b, second base portion 5b), and accordingly, the height can be reduced, which contributes to reduction in height of the force-feedback plane slide input device.

Also, the force-feedback plane slide input device 100 according to the present embodiment has the following configuration. The first actuating member 4 includes the first base portion 4b formed as a flat plate and having an approximate fan shape in plan view, and the first rotating shaft 4f serving as the center of rotation. The first gear portion 4c is formed on the side face corresponding to the arc-shaped edge of the first base portion 4b having the approximate fan shape. The first engagement portion 4a is formed on the first base portion 4b so as to protrude from one face of the arc-shaped edge side of the first base portion 4b having the approximate fan shape. The first rotating center hole 4d is formed at a central angle side of the approximate fan shape of the first base portion. The first rotating shaft 4f is turnably inserted through the first rotating center hole 4d. The second actuating member 5 also includes the second base portion 5b formed as a flat plate and having an approximate fan shape in plan view, and the second rotating shaft 5f serving as the center of rotation. The second gear portion 5c is formed on the side face of the second base portion 5b corresponding to the arc-shaped edge of the approximate fan shape. The second engagement portion 5a is formed on the second base portion 5b so as to protrude from one face of the arc-shaped edge side of the second base portion 5b having the approximate fan shape. The second rotating center hole 5d is formed at a central angle side of the approximate fan shape of the second base portion 5b. The second rotating shaft 5f is turnably inserted through the second rotating center hole 5d.

According to the related art, each of the actuating bodies 914, 915, and 916 which are parts having the same function as with the first actuating member 4 and second actuating member 5 has been formed by disposing a member having gear teeth formed at the side face in an overlaid manner. According to the present embodiment, the first actuating member 4 and second actuating member 5 are configured by providing the first gear portion 4c to the side face of the first base portion 4b, and providing the second gear portion 5c to the side face of the second base portion 5b. Thus, the member having gear teeth formed on the side face is not needed, so the number of parts is further reduced, and costs can further be reduced. Also, the related art has employed a configuration where the member having gear teeth formed on the side face is disposed in a manner overlaid with another member. The first actuating member 4 and second actuating member 5 are configured by providing the first gear portion 4c to the side face of the first base portion 4b, and providing the second gear portion 5c to the side face of the second base portion 5b, thereby reducing the height. Accordingly, an advantage is yielded in that a force-feedback plane slide input device with reduced costs and smaller product height can be provided.

Also, the force-feedback plane slide input device 100 according to the present embodiment may have the following configuration. The force-feedback plane slide input device 100 further includes spacers 8 configured to be engaged with the first rotating shaft 4f and the second rotating shaft 5f. The first rotating shaft 4f is formed in an approximate cylinder shape, includes the first recessed portion 4e formed in a recessed shape along the outer circumference of the first rotating shaft 4f at a portion protruding from the first base portion 4b of the first actuating member 4. The first recessed portion 4e is formed in a tapered shape so that the diameter increases as the distance from the first base portion 4b increases. The second rotating shaft 5f is formed in an approximate cylinder shape, includes the second recessed portion 5e formed in a recessed shape along the outer circumference of the second rotating shaft 5f at a portion protruding from the second base portion 5b of the second actuating member 5. The second recessed portion 5e is formed in a tapered shape so that the diameter increases as the distance from the second base portion 5b increases. The spacers 8 are engaged with the first recessed portion 4e and the second recessed portion 5e so as to be bent along the shapes defined by the inner portions of the first recessed portion 4e and the second recessed portion 5e. The outer circumferential end portion of the spacer 8 is pressed into contact with the first base portion 4b and the second base portion 5b.

Thus, when engaging the spacer 8 with the first recessed portion 4e in a state in which one end side of the first rotating shaft 4f protrudes from the first base portion 4b, the spacer 8 bends along the shape defined by the inner portion of the first recessed portion 4e, and accordingly, the outer circumferential end portion of the spacer 8 is evenly pressed into contact with the first base portion 4b. Therefore, the first rotating shaft 4f and first base portion 4b are engaged without looseness, smooth operation is enabled since the first base portion 4b does not readily tilt. Also, chattering sounds are prevented from occurring, even in the case where the unit is subjected to vibration. Note that the same advantages are yielded by engaging the spacer 8 with the second recessed portion 5e of the second rotating shaft 5f as well. Even if the first recessed portion 4e and second recessed portion 5e are not formed in a tapered shape but in a cylindrical shape, and what is generally called a spring washer or the like is inserted into the first recessed portion 4e and second recessed portion 5e instead of the spacer 8, the spring washer presses against the first base portion 4b and second base portion 5b. However, the pressing force of the spring washer varies depending on the contact locations, due to the structure thereof, so there are concerns that the first base portion 4b and second base portion 5b might tilt, and operation might become poorer.

The force-feedback plane slide input device according to the embodiment of the present invention has been described above in detail. However, the present invention is not restricted to the above-mentioned embodiment, and various modifications may be made without departing from the essence of the present invention. For example, the embodiment may be implemented by being modified as follows, and these embodiments also belong to the scope of the present invention.

(1) Though the operation member 3 and slider 2 have been formed in an integral manner by injection molding in the present embodiment, the operation member 3 and slider 2 may be provided separately and then engaged with each other, or each may be formed with a different material.

(2) Though there has not been provided a configuration to press the slider 2 against the inner bottom face direction of the housing space 1a in the present embodiment, a pressing member such as a leaf spring may be disposed between the slider 2 and the cover member 7 to press the slider 2 against the inner bottom face direction of the housing space 1a as long as this does not cause inconvenience to operation. Looseness of the slider 2 may be suppressed by pressing the slider 2 against the inner bottom face direction of the housing space 1a, and advantages may be yielded such as improvement in feel of operation, suppression of occurrence of abnormal noise due to vibration, and so forth.

(3) Though there is no portion illuminated in the present embodiment as described above, illuminated portions may be provided to the operation knob KB or the like as appropriate. In accordance with this, a light source, light guide member, and so forth may be provided to the force-feedback plane slide input device.

What is claimed is:
1. A force-feedback plane slide input device comprising:
 a base body having a housing space formed in a rectangular shape in plan view;
 a slider disposed within the housing space and configured to be slidable along a plane including a first direction and a second direction which are orthogonal to each other;
 an operation member integrally formed with the slider;

a first actuating member including a first engagement portion configured to be rotated by sliding movement of the operation member in the first direction;

a second actuating member including a second engagement portion configured to be rotated by sliding movement of the operation member in the second direction; and a force-feedback unit configured to feed back a sense of force acting in the planar direction to an operator via the operation member;

wherein the slider includes
a first slider member configured to move in the first direction, and
a second slider member configured to move in the second direction; and wherein a length of an edge in the first direction of the housing space is substantially the same as a width in the first direction of the second slider member.

2. The force-feedback plane slide input device according to claim 1, wherein the first actuating member includes a first base portion having an approximate fan shape in plan view and formed as a flat plate, and a first rotating shaft serving as the center of rotation;

wherein a first gear portion is formed on a side face corresponding to an arc-shaped edge of the first base portion having the approximate fan shape;

wherein the first engagement portion is formed on one face of the first base portion so as to protrude from the arc-shaped edge side of the approximate fan shape;

wherein a first rotating center hole is formed at a central angle side of the approximate fan shape of the first base portion;

wherein the first rotating shaft is turnably inserted through the first rotating center hole;

wherein the second actuating member includes a second base portion having an approximate fan shape in plan view and formed as a flat plate, and a second rotating shaft serving as the center of rotation;

wherein a second gear portion is formed on a side face corresponding to an arc-shaped edge of the second base portion having the approximate fan shape;

wherein the second engagement portion is formed on one face of the second base portion so as to protrude from the arc-shaped edge side of the approximate fan shape;

wherein a second rotating center hole is formed at a central angle side of the approximate fan shape of the second base portion; and wherein the second rotating shaft is turnably inserted through the second rotating center hole.

3. The force-feedback plane slide input device according to claim 1, further comprising:

spacers configured to be engaged with the first rotating shaft and the second rotating shaft;

wherein the first rotating shaft is formed in an approximate cylinder shape, includes a first recessed portion formed in a recessed shape along the outer circumference of the first rotating shaft at a portion protruding from the first base portion of the first actuating member, and the first recessed portion is formed in a tapered shape so that the diameter increases as the distance from the first base portion increases;

wherein the second rotating shaft is formed in an approximate cylinder shape, includes a second recessed portion formed in a recessed shape along the outer circumference of the second rotating shaft at a portion protruding from the second base portion of the second actuating member, and the second recessed portion is formed in a tapered shape so that the diameter increases as the distance increases from the second base portion; and wherein the spacers are engaged with the first recessed portion and the second recessed portion so as to be bent along the shapes defined by the inner portions of the first recessed portion and the second recessed portion, and the outer circumferential end portion of the spacers are pressed into contact with the first base portion and the second base portion.

* * * * *